A. DAUL.
PLANT-SUPPORTER.
No. 184,064. Patented Nov. 7, 1876.
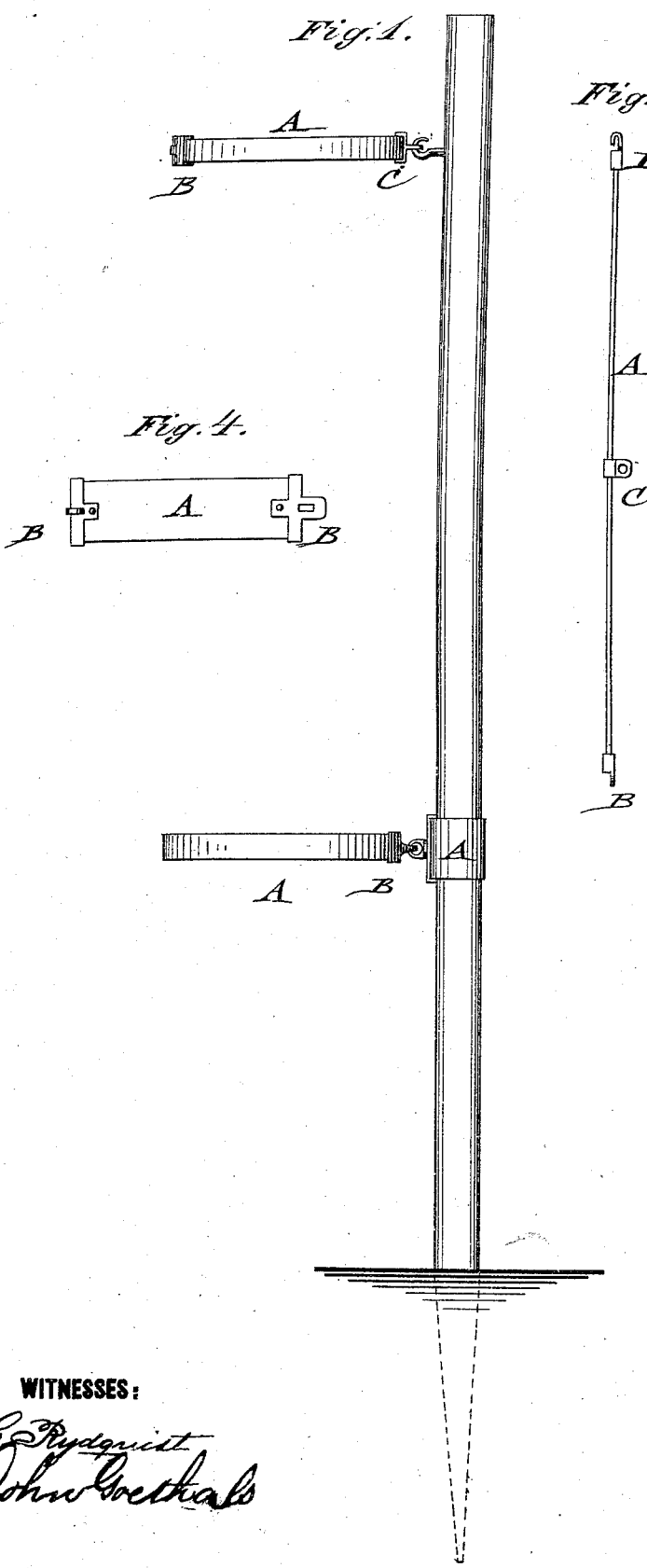

UNITED STATES PATENT OFFICE.

ANTHONY DAUL, OF NEWARK, NEW JERSEY, ASSIGNOR OF ONE-HALF HIS RIGHT TO EMIL KRAUSE, OF NEW YORK, N. Y.

IMPROVEMENT IN PLANT-SUPPORTS.

Specification forming part of Letters Patent No. 184,064, dated November 7, 1876; application filed September 30, 1876.

*To all whom it may concern:*

Be it known that I, ANTHONY DAUL, of Newark, in the county of Essex and State of New Jersey, have invented a new and Improved Plant-Supporter, of which the following is a specification:

In the accompanying drawing, Figure 1 represents a side view of my improved plant-supporter as applied to a stick, and Figs. 2, 3, and 4 are detail views of the same.

Similar letters of reference indicate corresponding parts.

The invention relates to improved means for fastening or hanging plants, flowers, vegetables, branches of trees, vines, &c., to any suitable point of support, as to sticks, trellises, walls, columns, &c., so that they serve in a neat, durable, and ornamental manner for supporting and training the plants in any desired position. The means hitherto used for this purpose, as cords, flax, the inner bark of trees, willow twigs, &c., are all more or less objectionable, as they have to be frequently renewed with the increased size of the plants, so that a great deal of time and labor are lost thereby.

My invention is designed to provide a plant-supporter or band that adapts itself readily to the growing plant, and may be quickly and cheaply applied. It consists of rubber bands with suitable devices for being attached to the point of support.

In the drawing, A are elastic bands or cords of rubber or other suitable elastic material, and of flat or tubular shape, the bands being made of varying width and length, according to the purpose for which they are to be used. The bands A are provided at the ends with metallic closing devices B, consisting of hook and eye, or two hooks, or any other equivalent fastening, by which the bands may be readily applied around the plants and to the point of support. I prefer to use a wider band, which is applied around the stick or trellis, as shown in Fig. 1, and attach to an eye or staple of the same a second narrower band, that is placed around the plants, flowers, &c., and hung by its end hooks to the supporting-band.

The band A may also be provided midway with an eye or staple, C, as shown in Figs. 1 and 2, to be hung to a hook or nail of the stick or trellis.

The elastic bands A form a neat, economical, and ornamental support for the plants, and may be used thereon for a considerable length of time, as they will not hinder the plant in growing to any extent, but expand therewith without cramping or injuring the same.

By adding to the material from which the supporting-bands are made, or by saturating them before use, with proper ingredients or solutions noxious to insects, the supporters will keep off the insects from the upper parts of the plants, and prevent thereby the injurious influence of the same.

Having thus described my invention, I claim as new and desire to secure by Letters Patent—

The plant-supporter consisting of an elastic band, A, with a fastening device, B, at each end, and an attaching loop or staple, C, in the middle, as and for the purpose set forth.

ANTHONY DAUL.

Witnesses:
PAUL GOEPEL,
EMIL KRAUSE.